US012091283B2

(12) United States Patent
Ruden et al.

(10) Patent No.: US 12,091,283 B2
(45) Date of Patent: Sep. 17, 2024

(54) ELEVATOR DOOR ASTRAGAL

(71) Applicant: OTIS ELEVATOR COMPANY, Farmington, CT (US)

(72) Inventors: Colette Ruden, West Hartford, CT (US); Michael J. Tracey, Cromwell, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 285 days.

(21) Appl. No.: 17/479,236

(22) Filed: Sep. 20, 2021

(65) Prior Publication Data

US 2023/0093391 A1 Mar. 23, 2023

(51) Int. Cl.
*B66B 13/30* (2006.01)

(52) U.S. Cl.
CPC .......... *B66B 13/308* (2013.01); *B66B 13/303* (2013.01)

(58) Field of Classification Search
CPC ...... B66B 13/30; B66B 13/303; B66B 13/308
See application file for complete search history.

(56) References Cited

U.S. PATENT DOCUMENTS 2,923,984 A * 2/1960 Jecmen .................. B66B 13/26 49/498.1
4,224,767 A * 9/1980 Jecmen ................ B66B 13/303 49/499.1
4,644,696 A * 2/1987 Bursk ...................... E05C 7/04 49/365
4,735,293 A * 4/1988 Everhart ............... B66B 13/303 49/309
5,085,293 A * 2/1992 Aime .................... E04B 1/6813 187/400
5,836,424 A * 11/1998 Allen .................... E06B 3/4636 49/120
6,360,487 B1 * 3/2002 Kern ........................ E06B 3/86 160/197
7,757,437 B2 * 7/2010 Schulte ................ E06B 3/4636 49/411
8,006,805 B2 * 8/2011 Greenaway ........... B66B 13/303 49/490.1
11,085,230 B2 * 8/2021 Shanahan ............ F25D 23/021
11,339,027 B2 * 5/2022 Kirsch ................. B66B 13/308
2018/0282129 A1 * 10/2018 Kirsch ...................... B32B 3/02

* cited by examiner

*Primary Examiner* — Janet M Wilkens
*Assistant Examiner* — Susan M. Heschel
(74) *Attorney, Agent, or Firm* — Carlson, Gaskey & Olds, P.C.

(57) ABSTRACT

An illustrative example embodiment of an elevator door assembly includes a door panel having at least one edge. A base is configured to be received adjacent the edge of the door panel. An astragal is configured to be at least partially received over the base such that the base holds the astragal in a selected position aligned with the edge of the door panel. The astragal is at least partially compressible for closing off an interface between the edge of the door panel and an adjacent surface.

20 Claims, 3 Drawing Sheets

ELEVATOR DOOR ASTRAGAL

BACKGROUND

Elevator system components are often assembled at the installation site. Some assembly procedures are time-consuming and include the possibility of inconsistencies, depending on the experience and skill of the installers. This is particularly true of the elevator door system components. Several of the door system components require precise positioning or adjustment that is ideally consistent for the entire elevator system. Such challenges make the installation more complex.

SUMMARY

An illustrative example embodiment of an elevator door assembly includes a door panel having at least one edge. A base is configured to be received adjacent the edge of the door panel. An astragal is configured to be at least partially received over the base such that the base holds the astragal in a selected position aligned with the edge of the door panel. The astragal is at least partially compressible for closing off an interface between the edge of the door panel and an adjacent surface.

In addition to one or more of the features described above, or as an alternative, the assembly includes a second door panel and wherein the adjacent surface is on an edge of the second door panel.

In addition to one or more of the features described above, or as an alternative, the assembly includes a plurality of clips that secure the base to the door panel.

In addition to one or more of the features described above, or as an alternative, the plurality of clips are at least partially resilient for selectively engaging the door panel.

In addition to one or more of the features described above, or as an alternative, the at least one edge of the door panel includes a plurality of openings and at least some of the plurality of clips are at least partially received through some of the openings, respectively, for securing the base adjacent the at least one edge of the door panel.

In addition to one or more of the features described above, or as an alternative, the clips each include a first portion that is configured to be inserted into one of the openings and at least one finger that is configured to hold the base adjacent the at least one edge of the door panel when the first portion is received in the one of the openings.

In addition to one or more of the features described above, or as an alternative, the base comprises a central body portion configured to be received against the at least one edge of the door panel and a plurality of ledges extending in opposite directions from the central body portion and the astragal comprises a plurality of channels that each receive at least a portion of one of the ledges for holding the astragal in the selected position.

In addition to one or more of the features described above, or as an alternative, the base comprises a metal extrusion.

In addition to one or more of the features described above, or as an alternative, the base comprises aluminum.

In addition to one or more of the features described above, or as an alternative, the astragal comprises an extrusion of a compressible material.

In addition to one or more of the features described above, or as an alternative, the compressible material is an elastomer.

In addition to one or more of the features described above, or as an alternative, the elastomer comprises rubber.

In addition to one or more of the features described above, or as an alternative, the astragal comprises an extrusion of a compressible material.

In addition to one or more of the features described above, or as an alternative, the astragal is snap-fit over the base.

The various features and advantages of at least one disclosed example embodiment will become apparent to those skilled in the art from the following detailed description. The drawings that accompany the detailed description can be briefly described as follows.

DETAILED DESCRIPTION

Figure 1:
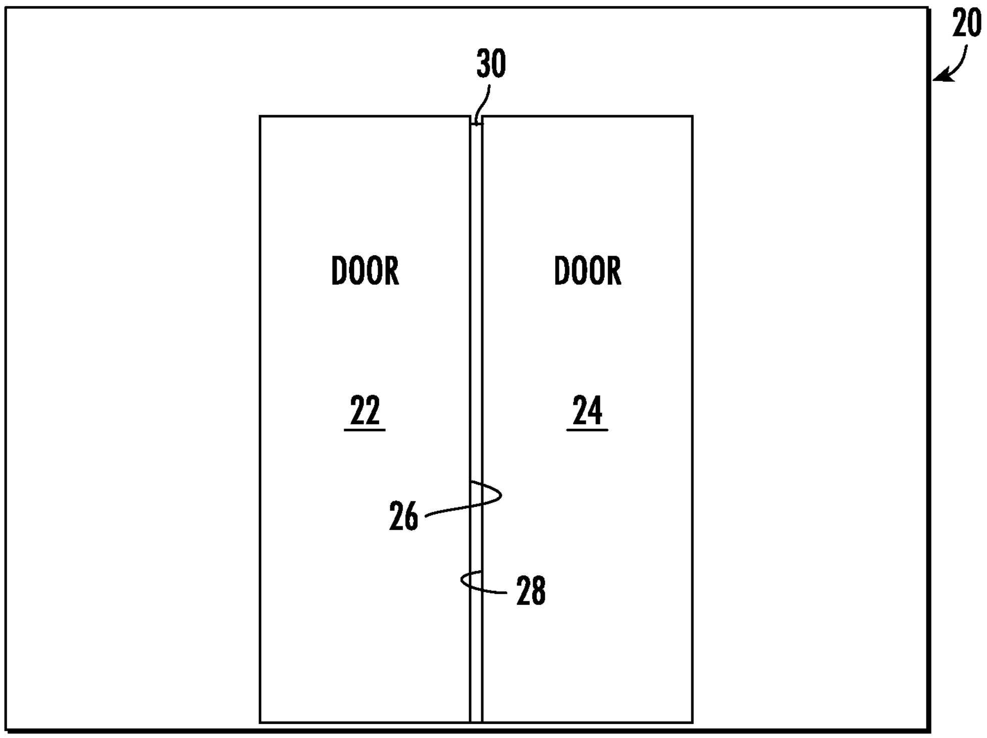
FIG. 1 schematically illustrates portions of an elevator door assembly.

FIG. 1 schematically illustrates an elevator door assembly 20 including two door panels 22, 24. In this example embodiment, the door panels 22, 24 move apart or away from each other into an open position to facilitate an individual boarding or exiting an elevator car. The door panel 22 has an edge 26 that faces toward an edge 28 on the door panel 24. The edges 26 and 28 are close to each other when the door panels 22, 24 are in a fully closed position.

An astragal assembly 30 closes off the interface between the edges 26, 28 when the door panels 22, 24 are in a fully closed position. As can be appreciated from FIGS. 2-5, the astragal assembly 30 includes a base 32 that is received against the edge 28 of the door panel 24. The base 32 may be installed on the edge of either of the door panels.

An astragal 34 is at least partially received over the base 32 such that the base 32 holds the astragal 34 in a selected position aligned with the edge 28 of the door panel 24. The astragal 34 is at least partially compressible for closing off the interface between the edges 26, 28. While the astragal 34 closes off or seals the interface between two door panels 22, 24 in the illustrated example embodiment, other door assembly configurations include the astragal assembly 30 on an edge of a door that is received against a stationary surface, such as a door jamb.

The base 32 includes a central body portion 36 and a plurality of ledges 38 extending from opposite sides of the central body portion 36. The base 32 is a relatively stiff or rigid component in a width-wise direction. The base 32 in some embodiments is extruded of a metal or polymer material. An example embodiment includes an extruded aluminum base 32.

The astragal 34 includes a central body portion 40 and opposite ends 42 that are positioned relative to the central body portion 40 to establish a plurality of channels 44. The astragal 34 in some embodiments is extruded of a compressible material. An example embodiment includes an extruded rubber astragal 34. Other materials are used for at least one of the base 32 or the astragal 34 in some embodiments.

The ledges 38 are at least partially received in the channels 44 such that the base 32 supports the astragal 34 in a desired position relative to the base 32 and the door panel edge 28 when the base 32 is secured to the door panel 24. The channels 44 establish a tight, snap-fit connection between the astragal 34 and the base 32. In this embodiment, the ledges 38 and the channels 44 extend along an entire length of the base 32 and the astragal 34, respectively.

Figure 2:
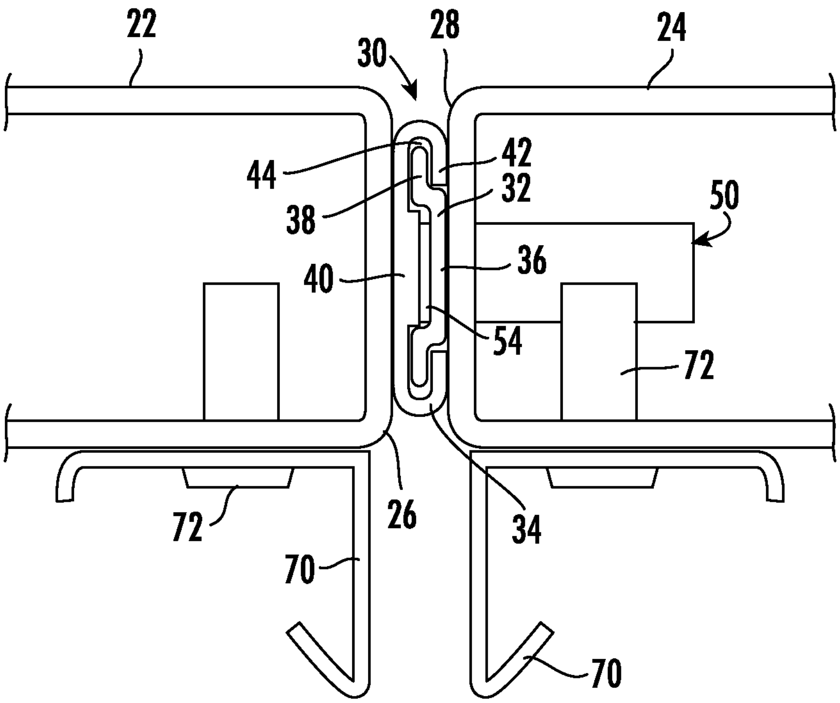
FIG. 2 is an end view of an example embodiment of an astragal at an interface between the two doors of the assembly shown in FIG. 1.
Figure 3:
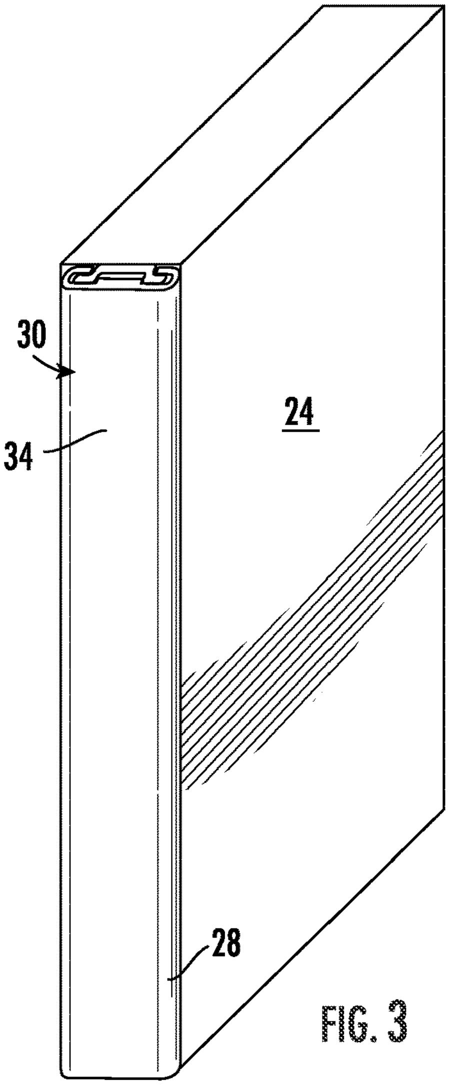
FIG. 3 is a perspective view showing the example astragal along one edge of a door.
Figure 4:
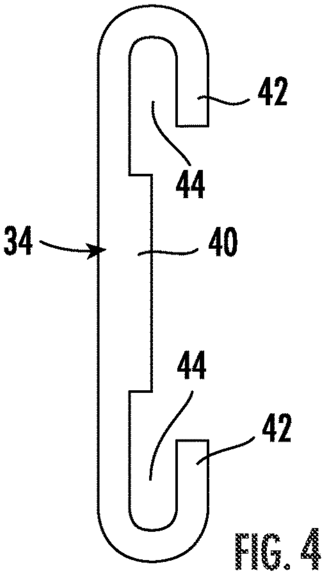
FIG. 4 is an illustration of features of an example astragal.
Figure 5:
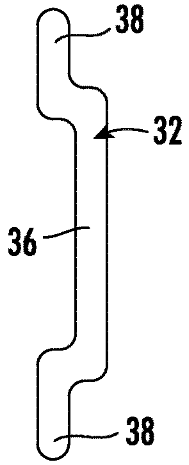
FIG. 5 is an illustration of features of an example base that is configured to support the astragal of FIG. 4 in place on the edge of a door.
Figure 6:
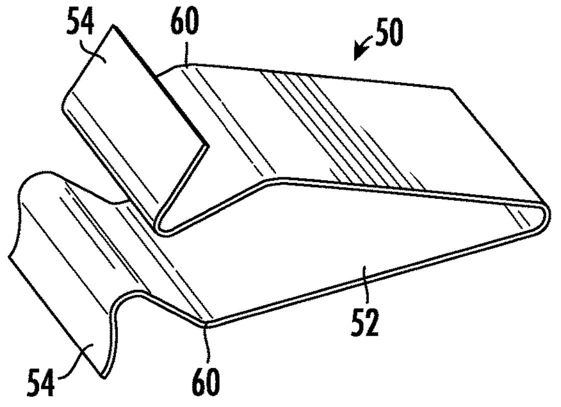
FIG. 6 illustrates an embodiment of a clip used to install and hold the base in position adjacent an edge of a door.
Figure 7:
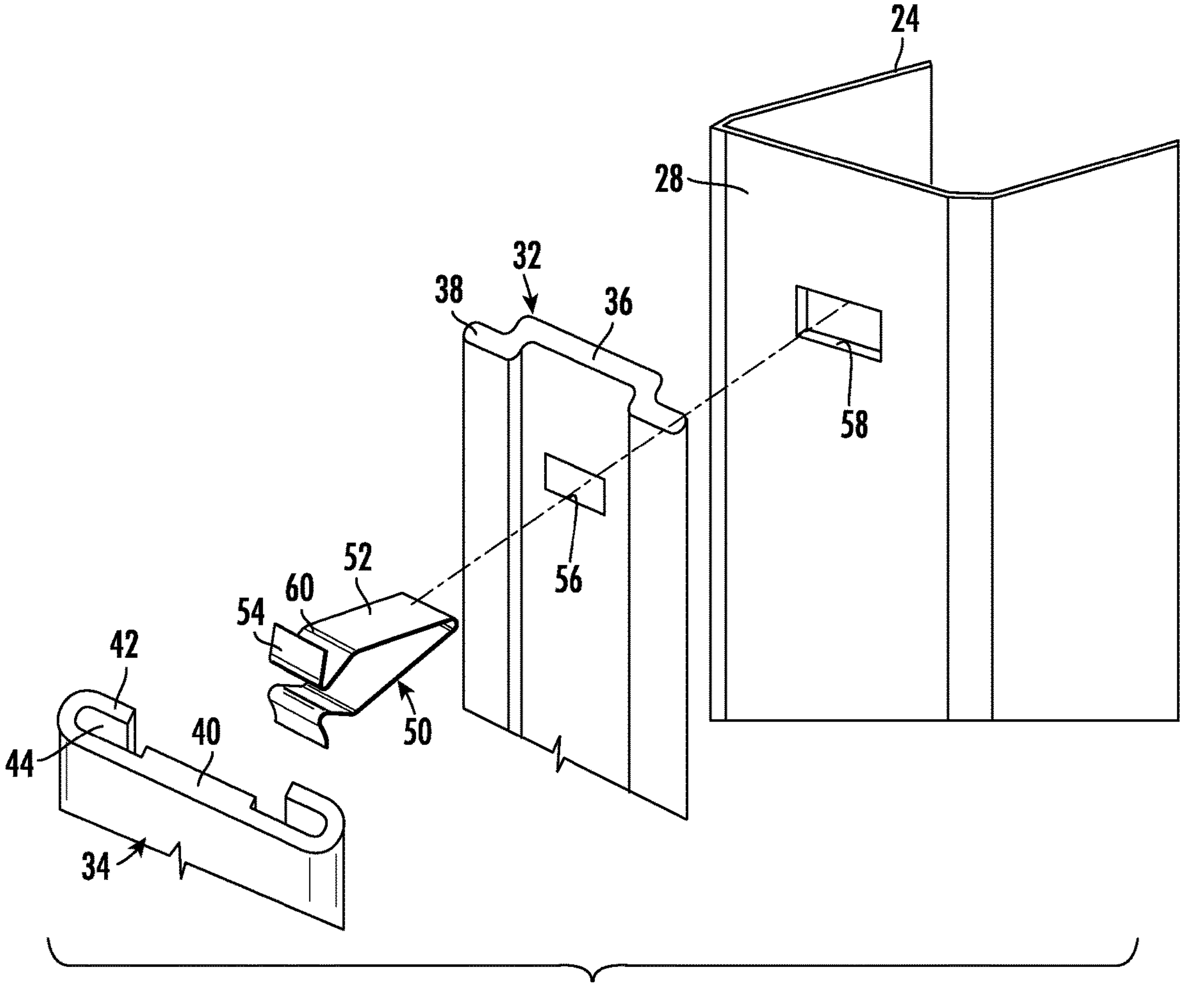
FIG. 7 is an exploded, perspective view of door assembly components showing a relationship between features used during installation of the astragal.

The base 32 is held in position against the edge 28 by a plurality of clips 50, which are shown in FIGS. 2, 6 and 7. Each clip 50 includes a resilient first portion 52 and at least one finger 54, two of which are included on the illustrated embodiment. The first portion 52 is at least partially resilient or compressible to be received through an opening 56 in the base and an opening 58 through the edge 28 of the door panel 24. The fingers 54 engage the outwardly facing surface of the central portion 36 of the base 32 and a shoulder 60 of the clip 50 is received against an inner surface of the door panel 24 to hold the base 32 against the edge 28.

In some embodiments, clips 50 are inserted into the openings 56 in the base and the astragal 34 is manipulated into position on the base 32. The astragal assembly 30 is then secured to the door panel 24 by inserting the clips 50 into the openings 58. In such embodiments, the astragal 34 is pre-assembled onto the base 32 and the clips 50 allow the assembly 30 to be snapped into place on the edge 28 of the door panel 24.

Other embodiments include snapping the base 32 into place against the edge 28 of the door panel 24 prior to securing the astragal 34 on the base 32. Once the base 32 is in place on the edge 28, the astragal 34 is manipulated onto the base 32 with the ledges 38 received in the channels 44, respectively to secure the astragal 34 in a desired or selected position relative to the edge 28 of the door panel 24.

One aspect of the astragal assembly 30 is that assembly is faster and easier than previous configurations. The snap-fit mounting of the base 32 on the edge 28 by the clips 50 is simple and relatively easy.

One aspect of the snap-fit connection between the base 32 and the astragal 34 is a simplified assembly of those two components. There is no need to pass any fasteners through the astragal 34 to situate it in a desired position. This allows for quicker and more consistent installation. The cooperation between the base 32 and the astragal 34 also avoids any dimpling or deformation of the astragal at a location of a fastener.

The way in which prior astragal designs were installed included passing screws through an astragal that was received at least partially between the door panel and a sight guard. Sight guards 70 and mounting screws 72 are shown in FIG. 2. Separating installation of the astragal 34 from installation of the sight guard eliminates the possibility that a screw that is tightened too much will compress the astragal material and that different amounts of compression or deformation may occur. This results in a more consistent door assembly appearance and a more consistent closure or seal at the interface between the edges 26, 28.

Another aspect of the example astragal assembly 30 is that the astragal assembly 30 may be installed prior to shipping the door panel 24 to the elevator system installation site. Since the astragal assembly is along the edge 28, it does not make packaging or shipping multiple door panels any more difficult. The sight guards 70 are typically not mounted to the door panels 22, 24 until the door components arrive at the installation site because they introduce geometric complexity that interfere with efficient shipment of the doors. Separating the astragal assembly 30 from the sight guards 70 allows for the astragal assembly to be completed and secured to the door panel 24 in a factory setting, which can further enhance the economies that are improved by the astragal assembly 30.

Elevator door systems that include an astragal assembly like the assembly 30 make door installation more efficient and economical while simultaneously providing more consistent performance and appearance.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator door assembly, comprising:

a door panel having at least one edge;

a base configured to be received adjacent the at least one edge of the door panel, wherein the base includes a central body portion and a plurality of ledges extending from opposite sides of the central body portion; and an astragal configured to be at least partially received over the base such that the base holds the astragal in a selected position aligned with the at least one edge of the door panel, wherein the astragal includes a central body portion and opposite ends that are spaced apart from each other by a gap within which the central body portion of the base is positioned, and the astragal being at least partially compressible for closing off an interface between the at least one edge of the door panel and an adjacent surface.

2. The assembly of claim 1, comprising a second door panel and wherein the adjacent surface is on an edge of the second door panel.

3. The assembly of claim 1, comprising a plurality of clips that secure the base to the door panel.

4. The assembly of claim 3, wherein the plurality of clips are at least partially resilient for selectively engaging the door panel.

5. The assembly of claim 4, wherein:

the at least one edge of the door panel includes a plurality of openings; and at least some of the plurality of clips are at least partially received through some openings of the plurality of openings, respectively, for securing the base adjacent the at least one edge of the door panel.

6. The assembly of claim 5, wherein the plurality of clips each include a first portion that is configured to be inserted into one of the openings and at least one finger that is configured to hold the base adjacent the at least one edge of the door panel when the first portion is received in the one of the openings.

7. The assembly of claim 1, wherein:

the central body portion includes a rear surface configured to be received against the at least one edge of the door panel and the plurality of ledges have opposing sides and extend in opposite directions from the central body portion in a direction that is parallel to the rear surface; and the opposite ends of the astragal comprise curved portions that are positioned relative to the central body portion to establish a plurality of C-shaped channels where each C-shaped channel extends around the opposing sides of one ledge of the plurality of ledges to hold the astragal in the selected position.

8. The assembly of claim 7, wherein the base comprises a metal extrusion.

9. The assembly of claim 8, wherein the base comprises aluminum.

10. The assembly of claim 7, wherein the astragal comprises an extrusion of a compressible material.

11. The assembly of claim 10, wherein the compressible material is an elastomer.

12. The assembly of claim 11, wherein the elastomer comprises rubber.

13. The assembly of claim 1, the astragal comprises an extrusion of a compressible material.

14. The assembly of claim 13, wherein the astragal is snap-fit over the base.

15. The assembly of claim 1, wherein the door panel comprises a first elevator door panel and the at least one edge comprises a first edge for the first elevator door panel, and including a second elevator door panel with a second edge that faces the first edge, and wherein the base is attached to the first edge and the astragal is compressible against the second edge.

16. An elevator door assembly, comprising:

a first elevator door panel having a first edge;

a second elevator door panel having a second edge facing the first edge;

a base attached to the first edge; and an astragal at least partially received over the base such that the base holds the astragal in a selected position aligned with the second edge, wherein the astragal comprises a central body portion with curved opposing ends extending from opposite sides of the central body portion, and wherein the curved opposing ends are spaced apart from each other by a gap, and the astragal being at least partially compressible against the second edge for closing off an interface between the first edge and the second edge.

17. The assembly of claim 16, wherein the base includes at least one first opening and the first edge includes at least one second opening aligned with the at least one first opening, and including a clip that is inserted through aligned first and second openings to secure the base to the first elevator door panel.

18. The assembly of claim 17, wherein the clip comprises a resilient first portion that is inserted through the aligned first and second openings and at least one finger that is positioned between a central portion of the base and the astragal, and wherein the central portion of the base is positioned within the gap between the curved opposing ends of the astragal.

19. The assembly of claim 18, wherein the central portion of the base has a rear surface configured to be received against the first edge, and wherein the base further comprises a pair of ledges extending from opposite sides of the central portion, wherein the pair of ledges is offset from the central body portion, and wherein the pair of ledges have opposing sides that extend in a direction that is parallel to the rear surface.

20. The assembly of claim 19, wherein the curved opposing ends form a pair of C-shaped channels that receive the pair of ledges such that each C-shaped channel extends around the opposing sides of one ledge of the pair of ledges.

* * * * *